(12) United States Patent
Hartmann-Thompson et al.

(10) Patent No.: US 12,122,797 B2
(45) Date of Patent: Oct. 22, 2024

(54) ORGANOSILANE, IONIC ORGANOSILANE, MEMBRANE COMPOSITION, AND MEMBRANE

(71) Applicant: 3M INNOVATIVE PROPERTIES COMPANY, St. Paul, MN (US)

(72) Inventors: Claire Hartmann-Thompson, Lake Elmo, MN (US); Marina M. Kaplun, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 557 days.

(21) Appl. No.: 17/612,469

(22) PCT Filed: Jun. 12, 2020

(86) PCT No.: PCT/IB2020/055547
§ 371 (c)(1),
(2) Date: Nov. 18, 2021

(87) PCT Pub. No.: WO2020/254930
PCT Pub. Date: Dec. 24, 2020

(65) Prior Publication Data
US 2022/0251120 A1    Aug. 11, 2022

Related U.S. Application Data

(60) Provisional application No. 62/862,327, filed on Jun. 17, 2019.

(51) Int. Cl.
C07F 7/08        (2006.01)
C08F 212/08      (2006.01)
C08K 5/54        (2006.01)

(52) U.S. Cl.
CPC ............ C07F 7/081 (2013.01); C08F 212/08 (2013.01); C08K 5/5406 (2013.01)

(58) Field of Classification Search
CPC ...... C07F 7/081; C07F 7/0812; C08F 212/08; C08K 5/5406; C08K 5/5477; C08G 77/04; C08G 77/24; C08G 77/26; C08G 77/32; C08G 77/388; C08G 77/60; C08L 83/08;
(Continued)

(56) References Cited

U.S. PATENT DOCUMENTS 5,527,934 A  *  6/1996  Jung ........................ C07F 7/14
                                              556/415
6,384,172 B1    5/2002  Dvornic
7,816,477 B2   10/2010  Suwa
(Continued)

FOREIGN PATENT DOCUMENTS

CN     1546536 A    11/2004
CN    103030826     4/2013
(Continued)

OTHER PUBLICATIONS

Organically modified silica (ORMOSIL) bearing imidazolium—Based ionic liquid prepared by hydrolysis/co-condensation of silane precursors: Synthesis, characterization and use in epoxy networks Carvalho A. P. A. et al. European Polymer Journal 83 (2016) 311-322 (Year: 2016).*

(Continued)

*Primary Examiner* — Andrew J. Oyer
*Assistant Examiner* — Cullen L G Davidson

(57) ABSTRACT

A dihaloorganosilane is represented by the formula (I): Each X independently represents Cl, Br, or I. Each $Ar^1$ independently represents a phenylene group optionally substituted by 1 to 4 alkyl groups selected from methyl or ethyl. Each $R^1$ independently represents an alkylene group having from 2 to 18 carbon atoms. Each $R^2$ independently represents methyl or ethyl. Each $R^3$ independently represents an alkylene group having from 1 to 18 carbon atoms. Each $R^4$ independently represents an alkylene group having from 2 to 18 carbon atoms, and n is an integer in a range of 0 to 5, inclusive. Ionic organosilanes preparable from the dihaloorganosilanes are represented by the formula (II): Membrane compositions and membranes containing the ionic organosilanes are also disclosed.

formula (I)

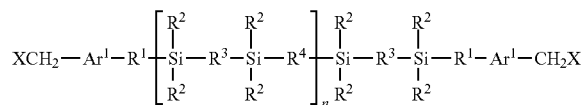

formula (II)

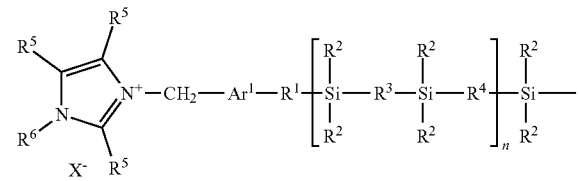
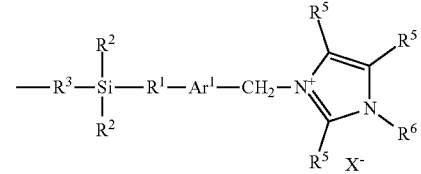

21 Claims, No Drawings

(58) Field of Classification Search
CPC ..... C08L 83/16; C09D 183/08; C09D 183/16; C08J 5/18; C08J 2325/08
See application file for complete search history.

(56) References Cited

U.S. PATENT DOCUMENTS

| | | | |
|---|---|---|---|
| 9,481,939 | B2 | 11/2016 | Masel |
| 9,580,824 | B2 | 2/2017 | Masel |
| 9,849,450 | B2 | 12/2017 | Masel |
| 9,945,040 | B2 | 4/2018 | Masel |
| 2017/0189898 | A1 | 7/2017 | Masel |

FOREIGN PATENT DOCUMENTS

| | | |
|---|---|---|
| EP | 0 251 511 B1 | 8/1994 |
| JP | 2015-125888 | 7/2015 |
| JP | 2015-129204 | 7/2015 |
| WO | WO 2016-039999 | 3/2016 |
| WO | WO 2016-064440 | 4/2016 |
| WO | WO 2020-121135 | 6/2020 |
| WO | WO 2020-225621 | 11/2020 |
| WO | WO 2020-250057 | 12/2020 |
| WO | WO 2021-038342 | 3/2021 |

OTHER PUBLICATIONS

Appel, "Frontiers, Opportunities, and challenger in biochemical and chemical catalysis of $CO_2$ fixation", Chem. Rev. 2013, vol. 113, pp. 6621-6658.
Brook, "Silicon in Organic, Organometallic and Polymer Chemistry", 2000, pp. 294-295.
Brydson, Plastics Materials, Butterworth-Heineman, Oxford, 1995, pp. 186-187.
Costentin, "Catalysis of the electrochemical reduction of carbon dioxide", Chem. Soc. Rev., 2013, vol. 42, pp. 2423-2436.
Di Meglio, "Selective conversion of $CO_2$ to CO with high efficiency using an inexpensive bismuth-based electrocatalyst", J. Am. Chem. Soc., 2013, vol. 135, pp. 8798-8801.
Dubois, "Electrochemical reactions of carbon dioxide", Encyclopedia of Electrochemistry, 2006, vol. 7A, pp. 202-225.
Fang, "Novel anion exchange membranes based on polymerizable imidazolium salt for alkaline fuel cell applications", J. Mater. Chem, 2011, vol. 21, pp. 11340-11346.
Gattrell, "A review of the aqueous electrochemical reduction of $CO_2$ to hydrocarbons at copper", Journal of electroanalytical chemistry, 2006, vol. 594, pp. 01-19.
Hori, "Electrochemical $CO_2$ reduction on metal electrodes" Modern Aspects of Electrochemistry, 2008, vol. 42, pp. 89-189.
Hugar, "Imidazolium cations with exceptional alkaline stability: A systematic study f structure-stability relationships", J. Am. Chem. Soc. 2015, vol. 137, pp. 8730-8737.
Inglis, "Electrocatalytic pathways towards sustainable fuel production from water and $CO_2$", Coordination chemistry reviews, 2012, vol. 256, pp. 2571-2600.
Kondratenko, "Status and perspectives of $CO_2$ conversion into fuels and chemicals by catalytic, photocatalytic and electrocatalytic processes", Energy Environ. Sci, 2013, vol. 6, pp. 3112-3135.

Kutz, "Sustainion imidazolium-functionalised polymers for carbon dioxide electrolysis", Energy Technology, 2017, vol. 5, pp. 929-936.
Lau, "New insights into the role of imidazolium-based promoters for the electroreduction of $CO_2$ on a silver electrode", J. Am. Chem. Soc., 2016, vol. 138, pp. 7820-7823.
Li, "Novel anion exchange membranes based on polymerizable imidazolium salt for alkaline fuel cell applications", J. Mater. Chem., 2011, vol. 21, pp. 11340-11346.
Lim, "A review on the electrochemical reduction of $CO_2$ in fuel cells, metal electrodes and molecular catalysts", Catalysis Today, 2014, vol. 233, pp. 169-180.
Lin, "Alkaline stable C2-substituted imidazolium-based anion-exchange membranes", Chem. Mater., 2013, vol. 25, pp. 1858-1867.
Long, "Hydroxide degradation pathways for imidazolium cations: A DFT study", J. Phys. Chem. C, 2014, vol. 118, pp. 9880-9888.
Ma, "A short review of catalysis for $CO_2$ conversion", Catalysis Today, 2009, vol. 148, pp. 221-231.
Masel, "$CO_2$ conversion to chemicals with emphasis on using renewable energy/resources to drive the conversion", Royal Society of chemistry, 2016, pp. 215-257.
Matsubara, "Thermodynamic aspects of electrocatalytic $CO_2$ reduction in acetonitrile and with an ionic liquid as solvent or electrolyte", ACS Catal., 2015, vol. 5, pp. 6440-6452.
Medina-Ramos, "Efficient conversion of $CO_2$ to CO using tin and other inexpensive and easily prepared post-transitions metal catalysts", J. Am. Chem. Soc., 2015, vol. 137, pp. 5021-5027.
Oh, "Ionic liquids enhance the electrochemical $CO_2$ reduction catalyzed by $MoO_2$", Chem. Commun., 2015, vol. 51, pp. 13698-13701.
Pellerite, "Imidazolium-functionalized polymer membranes for fuel cells and elctrolyzers", The electrochemical society, 2017, vol. 80, No. 8, pp. 945-956.
Qiao, "A review of catalysts for the electroreduction of carbon dioxide to produce low-carbon fuels", Chem. Soc.Rev., 2014, vol. 43, pp. 631-675.
Randall, "Silicone Surfactants", Marcel Dekker, 1999, pp. 11.
Rosen, "In situ spectroscopic examination of a low overpotential pathway for carbon dioxide conversion to carbon monoxide", J. Phys. Chem. C, 2012, vol. 116, pp. 15307-15312.
Rosen, "Ionic liquid-mediated selective conversion of $CO_2$ to CO at low overpotentials", Science, 2011, vol. 334, pp. 643-644.
Sun, "Switching the reaction course of electrochemical $CO_2$ reduction with ionic liquids", Langmuir, 2014, vol. 30, pp. 6302-6308.
Tang, "Poly(ionic liquid)s as new materials for $CO_2$ absorption", Journal of Polymer Science: Part A: Polymer Chemistry, 2005, vol. 43, pp. 5477-5489.
Yang, "Highly alkaline stable N1-alkyl substituted 2-methylimidazolium functionalized alkaline anion exchange membranes", J. Mater. Chem. A, 2015, vol. 2, pp. 8559-8565.
Ye, "Relative chemical stability of imidazolium-based alkaline anion exchange polymerized ionic liquids", Macromolecules, 2011, vol. 44, pp. 8494-8503.
Zhou, "Highly selective electrocatalystic reduction of carbon dioxide to carbon monoxide on silver electrode with aqueous ionic liquids", Electrochemistry Communications, 2014, vol. 46, pp. 103-106.
International Search report for PCT International Application No. PCT/IB2020/055547 mailed on Aug. 27, 2020, 4 pages.

\* cited by examiner

ORGANOSILANE, IONIC ORGANOSILANE, MEMBRANE COMPOSITION, AND MEMBRANE

CROSS-REFERENCE TO RELATED APPLICATIONS

This application is a national stage filing under 35 U.S.C. 371 of PCT/IB2020/055547, filed Jun. 12, 2020, which claims the benefit of U.S. Provisional Application No. 62/862,327, filed Jun. 17, 2019, the disclosure of which is incorporated by reference in its entirety herein.

GOVERNMENT RIGHTS

This invention was made with Government support under Cooperative Agreement DE-AR0000950 awarded by the U.S. Department of Energy. The U.S. Government may have certain rights in this invention.

BACKGROUND

Anion exchange membranes are useful in various electrochemical cells such as, for example, fuel cells, electrolyzers, batteries, and electrodialysis cells. Previous anion exchange membranes have been prepared from various copolymers having cationic, nitrogen-containing groups. These copolymers have been prepared, for example, by reacting styrene-co-4-vinylbenzyl chloride copolymers with various nitrogen-containing bases to provide corresponding quaternary ammonium groups. Typical membranes formed in this manner have inadequate mechanical strength for uses such as those described above. For example, the membranes often are brittle and have low tensile strength.

SUMMARY

Toughening and improved elongation are desirable in anion exchange membranes used in carbon dioxide or water electrolysis, fuel cells, flow batteries, and similar electrochemical devices. The present disclosure provides ionic organosilanes suitable for inclusion in membrane polymers that may overcome the above-referenced deficiencies of anion exchange membranes.

Polymers are commonly toughened by adding an impact modifier such as a silicone which forms a low $T_g$ second phase. However, in an electrochemical membrane, such an inert second phase occupies volume, does not contribute to conductivity, and thus decreases conductivity per unit volume relative to the same polymer without the additive. In addition, silicones may be chemically unstable even under mildly alkaline conditions.

Ionic organosilanes described in the present disclosure improve membrane elongation to break and toughness, with an unexpected combination of the benefits of carrying functionality that contributes to conductivity, and chemical stability under alkaline conditions.

In one aspect, the present disclosure provides a dihaloorganosilane represented by the formula:

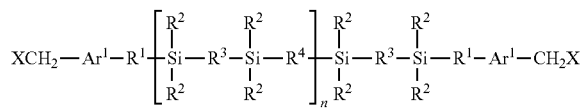

wherein:
each X independently represents Cl, Br, or I;
each $Ar^1$ independently represents a phenylene group optionally substituted by 1 to 4 alkyl groups selected from methyl or ethyl;
each $R^1$ independently represents an alkylene group having from 2 to 18 carbon atoms;
each $R^2$ independently represents methyl or ethyl;
each $R^3$ independently represents an alkylene group having from 1 to 18 carbon atoms;
each $R^4$ independently represents an alkylene group having from 2 to 18 carbon atoms; and
n is an integer in a range of 0 to 5, inclusive.

In another aspect, the present disclosure provides an ionic organosilane represented by the formula:

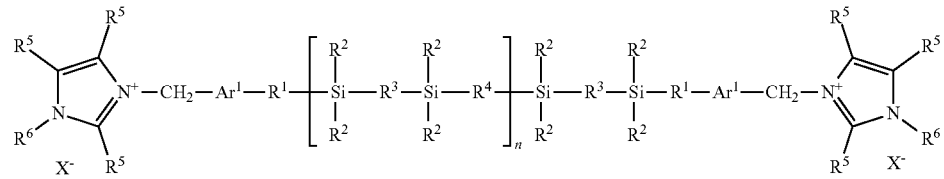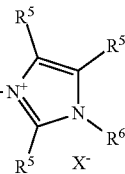

wherein:
each X independently represents Cl, Br, or I;
each $Ar^1$ independently represents a phenylene group optionally substituted by 1 to 4 alkyl groups selected from methyl or ethyl;
each $R^1$ independently represents an alkylene group having from 2 to 18 carbon atoms;
each $R^2$ independently represents methyl or ethyl;
each $R^3$ independently represents an alkylene group having from 1 to 18 carbon atoms;
each $R^4$ independently represents an alkylene group having from 2 to 18 carbon atoms;
each $R^5$ independently represents H or methyl;
each $R^6$ independently represents alkyl having from 1 to 4 carbon atoms, or allyl; and
n is an integer in a range of 0 to 5, inclusive.

In yet another, the present disclosure, the present disclosure provides a membrane composition comprising components:

(a) a copolymer comprising the divalent monomer units:

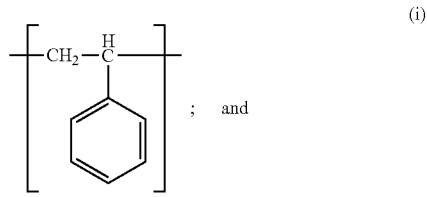

; and

-continued (ii)

$$\left[-CH_2-\underset{\underset{\underset{\underset{X^-}{\overset{}{\underset{R^5}{\bigvee}}}{\overset{R^5}{\underset{N}{\bigvee}}}}{\overset{H_2C}{\bigvee}}}{\overset{}{\bigvee}}-\right]$$

wherein:
R⁵ represents H or methyl;
R⁶ represents alkyl having from 1 to 4 carbon atoms, or allyl; and
X represents Cl, Br, or I, and
wherein monomer unit (i) and monomer unit (ii) are present in a respective mole ratio of 1.5:1 to 3:1; and
(b) an ionic organosilane compound represented by the formula:

$$\underset{R^6}{\overset{R^5}{\underset{X^-}{\overset{}{\bigvee}}}}\underset{R^5}{\overset{}{\bigvee}}N^+\!-\!CH_2\!-\!Ar^1\!-\!R^1\!\!\left[\!\!\begin{array}{c}R^2\\|\\Si\\|\\R^2\end{array}\!-\!R^3\!-\!\begin{array}{c}R^2\\|\\Si\\|\\R^2\end{array}\!-\!R^4\!\right]_n\!\!\begin{array}{c}R^2\\|\\Si\\|\\R^2\end{array}\!-\!R^3\!-\!\begin{array}{c}R^2\\|\\Si\\|\\R^2\end{array}\!-\!R^1\!-\!Ar^1\!-\!CH_2\!-\!N^+\underset{X^-}{\overset{R^5}{\underset{R^5}{\overset{}{\bigvee}}}}R^6$$

wherein:
each Ar¹ independently represents a phenylene group optionally substituted by 1 to 4 alkyl groups selected from methyl or ethyl;
each R¹ independently represents an alkylene group having from 2 to 18 carbon atoms;
each R² independently represents methyl or ethyl;
each R³ independently represents an alkylene group having from 1 to 18 carbon atoms;
each R⁴ independently represents an alkylene group having from 2 to 18 carbon atoms;
each R⁵ independently represents H or methyl;
each R⁶ independently represents alkyl having from 1 to 4 carbon atoms, or allyl; and
n is an integer in a range of 0 to 5, inclusive; and
wherein component (a) and component (b) are present in a respective weight ratio in a range of 99.5:0.5 to 98:2.

In yet another aspect, the present disclosure provides a membrane comprising a membrane composition according to the present disclosure.

As used herein:
"monomer unit" refers to the largest constitutional unit contributed by a single monomer molecule to the structure of a polymer.
"phenylene" generically refers to a divalent benzene ring;

o-phenylene has the formula:

m-phenylene has the formula;

and
p-phenylene has the formula:

Features and advantages of the present disclosure will be further understood upon consideration of the detailed description as well as the appended claims.

DETAILED DESCRIPTION

Organosilane
The ionic organosilane can be synthesized from a precursor organosilane represented by the formula:

$$XCH_2\!-\!Ar^1\!-\!R^1\!\!\left[\!\!\begin{array}{c}R^2\\|\\Si\\|\\R^2\end{array}\!-\!R^3\!-\!\begin{array}{c}R^2\\|\\Si\\|\\R^2\end{array}\!-\!R^4\!\right]_n\!\!\begin{array}{c}R^2\\|\\Si\\|\\R^2\end{array}\!-\!R^3\!-\!\begin{array}{c}R^2\\|\\Si\\|\\R^2\end{array}\!-\!R^1\!-\!Ar^1\!-\!CH_2X$$

wherein each of the various groups is independently selected as previously defined.

Throughout this specification:
Each X independently represents Cl, Br, or I. Cl is typically preferred.
Each Ar¹ independently represents a phenylene group optionally substituted by 1 to 4 alkyl groups selected from methyl or ethyl. The phenylene group may comprise o-, m-, or p-phenylene. p-Phenylene is typically preferred.
Each R¹ independently represents an alkylene group (i.e., divalent) having from 2 to 18 carbon atoms, preferably 2 to 8 carbon atoms, more preferably 2 or 3 carbon atoms, and even more preferably 2 carbon atoms. Exemplary alkylene groups include ethylene, propylene, butylene, isobutylene, pentylene, hexylene, cyclohexylene, octylene, decylene, dodecylene, tetradecylene, hexadecylene, and octadecylene.
Each R² independently represents methyl or ethyl, preferably methyl.

Each $R^3$ independently represents an alkylene group (i.e., divalent) having from 1 to 18 carbon atoms, preferably 2 to 8 carbon atoms, more preferably 2 to 6 carbon atoms, and even more preferably 2 to 4 carbon atoms. Exemplary alkylene groups include methylene, ethylene, propylene, butylene, isobutylene, pentylene, hexylene, cyclohexylene, octylene, decylene, dodecylene, tetradecylene, hexadecylene, and octadecylene.

Each $R^4$ independently represents an alkylene group (i.e., divalent) having from 2 to 18 carbon atoms, preferably 2 to 12 carbon atoms, more preferably 6 to 10 carbon atoms, and even more preferably 8 carbon atoms. Exemplary alkylene groups include ethylene, propylene, butylene, isobutylene, pentylene, hexylene, cyclohexylene, octylene, decylene, dodecylene, tetradecylene, hexadecylene, and octadecylene.

Each n is independently 0, 1, 2, 3, 4, or 5.

Precursor organosilanes can be made, for example, by a hydrosilation coupling of a dihydridocarbosilane with a halomethyl-substituted aralkene using a hydrosilylation catalyst (e.g., a Pt catalyst such as $H_2PtCl_6$ or Karstedt's catalyst) according to the reaction scheme below:

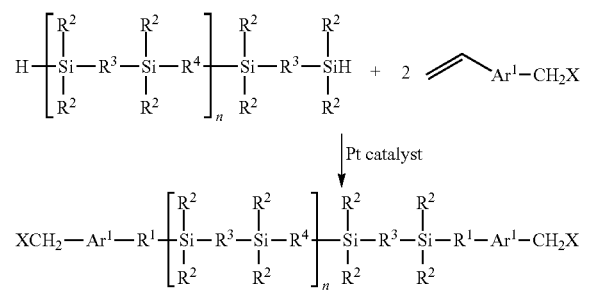

wherein $Ar^1$, $R^1$-$R^4$, X, and n are as previously defined.

Exemplary dihydridocarbosilanes include 1,1,4,4,-tetramethyl-1,4-disilabutane, 1,1,4,4,-tetraethyl-1,4-disilabutane, 1,1-dimethyl-4,4-dimethyl-1,4-disilabutane, 1,1,6,6-tetramethyl-1,6-disilahexane, 1,1,8,8-tetramethyl-1,4-disilaoctane, 1,1,10,10-tetramethyl-1,10-disiladecane, 1,1,12,12-tetramethyl-1,12-disiladodecane, 1,1,16,16-tetramethyl-1,16-disilahexadecane, 1,1,18,18-tetramethyl-1,18-disilaoctadecane, 1,1,12,12,20,20-hexamethyl-1,12,20-trisilaeicosane. Dihydridocarbosilanes can be made by reduction of corresponding chlorocarbosilanes using lithium aluminum hydride, for example, according to conventional methods.

Suitable dihydridocarbosilanes and/or their dichlorinated precursor counterparts may be synthesized by known methods and/or obtained from a commercial supplier; for example, Gelest Inc., Morrisville, Pennsylvania; ABCR, Karlsruhe, Germany; Alfa Aesar, Chennai, India; and TCI America, Portland, Oregon.

Exemplary halomethylphenylalkenes include p-chloromethylstyrene, p-bromomethylstyrene, p-iodomethylstyrene, m-chloromethylsytrene, o-chloromethylstyrene, p-allyl(chloromethyl)benzene, m-allyl(chloromethyl)benzene, o-allyl(chloromethyl)benzene, 4-chloromethyl-2-methylstyrene, 4-chloromethyl-3-methylstyrene, p-chloromethyl-2-propenylbenzene, and p-(chloromethyl)-1-buten-4-yl-benzene. Halomethylphenylalkenes can be obtained from commercial vendors such as, for example, Millipore-Sigma, Saint Louis, Missouri, or TCI America, Portland, Oregon, and/or synthesized by known methods.

Ionic Organosilane

The dihaloorganosilane discussed above can be converted into the ionic organosilane by reaction with an appropriate imidazole. Typically, the reaction is carried out by combining the dihaloorganosilane and an imidazole in solvent with optional heating.

Suitable imidazoles include 1-allylimidazole, 1-allyl-2-methylimidazole, 1-allyl-4-methylimidazole, 1-allyl-5-methylimidazole, 1-allyl-2,4-dimethylimidazole, 1-allyl-2,5-dimethylimidazole, 1-allyl-4,5-dimethylimidazole, 1-allyl-2,4,5-trimethylimidazole, 1-methylimidazole, 1,2-dimethylimidazole, 1,4-dimethyllimidazole, 1,5-dimethylimidazole, 1,2,4-trimethylimidazole, 1,2,5-trimethylimidazole, 1,2,4,5-tetramethylimidazole, 1-ethylimidazole, 1-propylimidazole, 1-butylimidazole, 1-isobutylimidazole, 1-ethyl-2-methylimidazole, 1-ethyl-4-methylimidazole, 1-ethyl-5-methylimidazole, 1-ethyl-2,4-dimethylimidazole, 1-ethyl-2,5-dimethylimidazole, 1-ethyl-2,4,5-trimethylimidazole, 1-propyl-2-methylimidazole, 1-propyl-4-methylimidazole, 1-propyl-5-methylimidazole, 1-propyl-2,4-dimethylimidazole, 1-propyl-2,5-imethylimidazole, 1-propyl-2,4,5-trimethylimidazole, 1-butyl-2-methylimidazole, 1-butyl-4-methylimidazole, 1-butyl-5-methylimidazole, 1-butyl-2,4-dimethylimidazole, 1-butyl-2,5-imethylimidazole, and 1-butyl-2,4,5-trimethylimidazole. Suitable imidazoles can be obtained from commercial chemical suppliers such as, for example, Millipore Sigma and/or synthesized by conventional methods.

Membrane Composition

The membrane composition comprises components:

(a) a copolymer comprising the divalent monomer units:

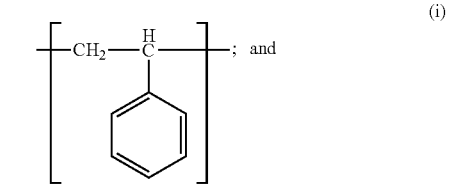

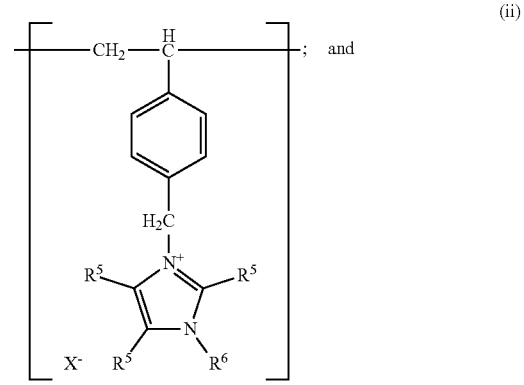

(b) ionic organosilane according to the present disclosure, wherein $R^1$ to $R^6$, X, and n are as previously defined.

Component (a) may be prepared by reaction of a copolymer of styrene and p-chloromethylstyrene (or p-bromomethylstyrene) with an imidazole that is functionalized with appropriate groups $R^5$ and $R^6$, for example, in the same manner as in the case of the preparation of the ionic organosilane discussed above. Conversion of the chloromethyl groups may be partially or essentially complete.

p-Chloromethylstyrene and styrene are commercially available or can be synthesized by conventional methods and can be copolymerized in essentially any ratio using conventional free-radical polymerization techniques (e.g. using a thermal free-radical initiator such as a peroxide). Alternatively, many copolymers of styrene and p-chloromethylstyrene (also known as 4-vinylbenzyl chloride) are available from commercial chemical suppliers. The respective molar ratio of monomer unit (i) to monomer unit (ii) is 60:40 (i.e., 1.5 to 1) to 75:25, or 60:40 to 70:30, preferably 65:35 to 70:30.

Membrane

The membrane composition can be formed into a membrane by any suitable technique including, for example, solvent casting. For example, any membrane thickness up to about one millimeter may be made in this manner. Other methods and membrane thicknesses may also be used. Membranes according to the present disclosure may be useful, for example, as anion exchange membranes for electrolyzers, electrodialysis cells, fuel cells, and flow batteries.

Select Embodiments of the Present Disclosure

In a first aspect, the present disclosure provides a dihaloorganosilane represented by the formula:

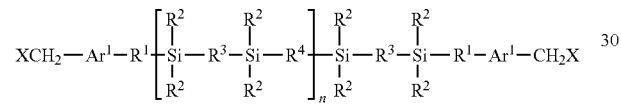

wherein X, $Ar^1$, $R^1$, $R^2$, $R^3$, $R^4$ and n are as previously defined.

In a second embodiment, the present disclosure provides a dihaloorganosilane according to the first embodiment, wherein each $R^1$ independently represents an alkylene group having 2 or 3 carbon atoms.

In a third embodiment, the present disclosure provides a dihaloorganosilane according to the first or second embodiment, wherein each $R^3$ independently represents an alkylene group having from 2 to 4 carbon atoms.

In a fourth embodiment, the present disclosure provides a dihaloorganosilane according to any of the first to third embodiments, each $R^4$ independently represents an alkylene group having from 6 to 10 carbon atoms.

In a fifth embodiment, the present disclosure provides a dihaloorganosilane according to any of the first to fourth embodiments, wherein n=0.

In a sixth embodiment, the present disclosure provides a dihaloorganosilane according to any of the first to fifth embodiments, wherein n=1.

In a seventh embodiment, the present disclosure provides an ionic organosilane represented by the formula:

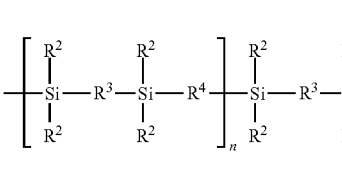

wherein X, $Ar^1$, $R^1$, $R^2$, $R^3$, $R^4$, $R^5$, $R^6$ and n are as previously defined.

In an eighth embodiment, the present disclosure provides an ionic organosilane according to the seventh embodiment, wherein each $R^1$ independently represents an alkylene group having 2 or 3 carbon atoms.

In a ninth embodiment, the present disclosure provides an ionic organosilane according to the seventh or eighth embodiment, wherein each $R^3$ independently represents an alkylene group having from 2 to 4 carbon atoms.

In a tenth embodiment, the present disclosure provides an ionic organosilane according to any of the seventh to ninth embodiments, wherein each $R^4$ independently represents an alkylene group having from 6 to 10 carbon atoms.

In an eleventh embodiment, the present disclosure provides an ionic organosilane according to any of the seventh to tenth embodiments, wherein n=0.

In a twelfth embodiment, the present disclosure provides an ionic organosilane according to any of the seventh to tenth embodiments, wherein n=1.

In a thirteenth embodiment, the present disclosure provides a membrane composition comprising components:

(a) a copolymer comprising the divalent monomer units:

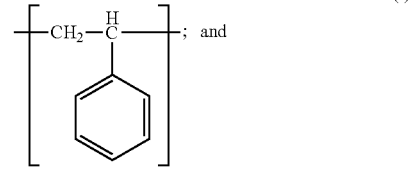

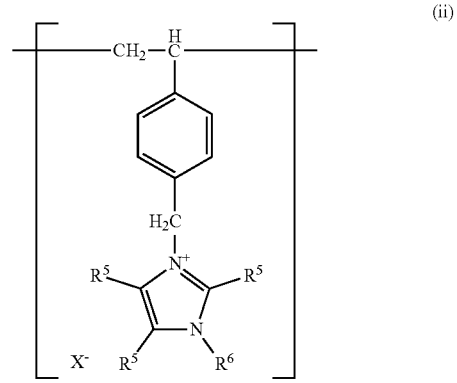

wherein:
  $R^5$ represents H or methyl;
  $R^6$ represents alkyl having from 1 to 4 carbon atoms, or allyl; and
  X represents Cl, Br, or I, and
  wherein monomer unit (i) and monomer unit (ii) are present in a respective mole ratio of 1.5:1 to 3:1; and

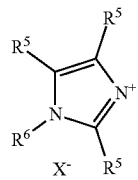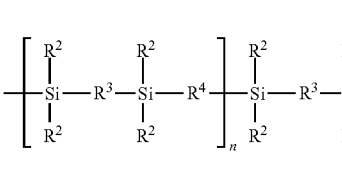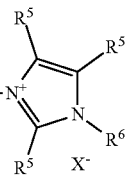

(b) an ionic organosilane compound represented by the formula:

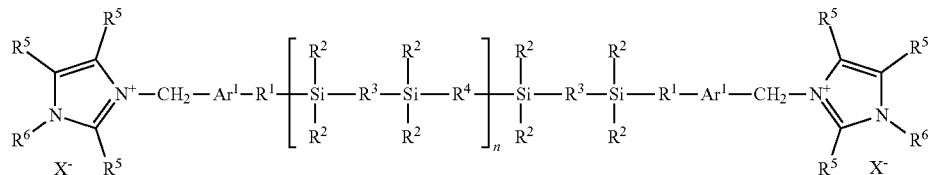

wherein:
each $Ar^1$ independently represents a phenylene group optionally substituted by 1 to 4 alkyl groups selected from methyl or ethyl;
each $R^1$ independently represents an alkylene group having from 2 to 18 carbon atoms;
each $R^2$ independently represents methyl or ethyl;
each $R^3$ independently represents an alkylene group having from 1 to 18 carbon atoms;
each $R^4$ independently represents an alkylene group having from 2 to 18 carbon atoms;
each $R^5$ independently represents H or methyl;
each $R^6$ independently represents alkyl having from 1 to 4 carbon atoms, or allyl; and
n is an integer in a range of 0 to 5, inclusive; and
wherein component (a) and component (b) are present in a respective weight ratio in a range of 99.5:0.5 to 98:2.

In a fourteenth embodiment, the present disclosure provides a membrane composition according to the thirteenth embodiment, wherein each $R^1$ independently represents an alkylene group having 2 or 3 carbon atoms.

In a fifteenth embodiment, the present disclosure provides a membrane composition according to the thirteenth or fourteenth embodiment, wherein each $R^3$ independently represents an alkylene group having from 2 to 4 carbon atoms.

In a sixteenth embodiment, the present disclosure provides a membrane composition according to any of the thirteenth to fifteenth embodiments, wherein each $R^4$ independently represents an alkylene group having from 6 to 10 carbon atoms.

In a seventeenth embodiment, the present disclosure provides a membrane composition according to any of the thirteenth to sixteenth embodiments, wherein n=0.

In an eighteenth embodiment, the present disclosure provides a membrane composition according to any of the thirteenth to sixteenth embodiments, wherein n=1.

In a nineteenth embodiment, the present disclosure provides a membrane composition according to any of the thirteenth to eighteenth embodiments, wherein $R^6$ represents alkyl having from 1 to 4 carbon atoms.

In a twentieth embodiment, the present disclosure provides an ionic organosilane according to any of the thirteenth to nineteenth embodiments, wherein $R^6$ represents allyl.

In a twenty-first embodiment, the present disclosure provides a membrane comprising a membrane composition according to any one of the thirteenth to twentieth embodiments.

Objects and advantages of this disclosure are further illustrated by the following non-limiting examples, but the particular materials and amounts thereof recited in these examples, as well as other conditions and details, should not be construed to unduly limit this disclosure.

Examples

Unless otherwise noted, all parts, percentages, ratios, etc. in the Examples and the rest of the specification are by weight. Table 1, below, reports materials used in the Examples.

TABLE 1

| MATERIAL | ABBREVIATION | DESCRIPTION |
|---|---|---|
| 4-Vinylbenzyl chloride | VBC | product no. 436887 from Millipore Sigma, St. Louis, Missouri |
| 1,1,4,4-Tetramethyl-1,4-disilabutane | — | product no. SIT7537.0 from Gelest, Inc., Morrisville, Pennsylvania |
| 1,7-Octadiene | — | product no. L07659 from Alfa Aesar, Ward Hill, Massachusetts |
| Platinum divinyltetramethyl-disiloxane complex | — | product no. SIP6830.3 from Gelest, Inc. |
| Tetramethylimidazole | TMIM | product no. T0971 from TCI America, Portland, Oregon |
| 1,2-Dimethylimidazole | DMIM | product no. B23544 from Alfa Aesar |
| N-Allylimidazole | N-Allyl IM | product no. L11053 from Alfa Aesar |
| Methoxypropanol | MP | obtained from Alfa Aesar |
| 1N Potassium hydroxide solution < 1 ppm metals | KOH | obtained from J. T. Baker, Baker Analyzed Reagent, VWR Scientific, Radnor, Pennsylvania |
| Deuterated acetonitrile | $CD_3CN$ | obtained from Cambridge Isotope Laboratories, Inc., Andover, Massachusetts |
| Deuterated dimethylformamide-D7 | $d_7$-DMF | obtained from Cambridge Isotope Laboratories, Inc. |
| Deuterated tetrahydrofuran-D8 | $d_8$-THF | obtained from Cambridge Isotope Laboratories, Inc. |

Preparation of Organosilane OS1:

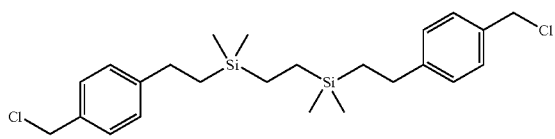 [SMILES: C[Si](C)(CCc1ccc(CCl)cc1)CC[Si](C)(C)CCc1ccc(CCl)cc1]

Platinum divinyltetramethyldisiloxane complex (1 drop, 2.1-2.4 wt. % Pt in xylene) was added to a solution of 1,1,4,4-tetramethyl-1,4-disilabutane (4.40 g, 0.030 mol) and vinylbenzyl chloride (9.17 g, 0.060 mol) in toluene (60 mL). After an initial exotherm, the reaction mixture was stirred at room temperature for 3 days, and toluene was removed in vacuo to give the product shown above as a colorless oil.

Preparation of Organosilane OS2:

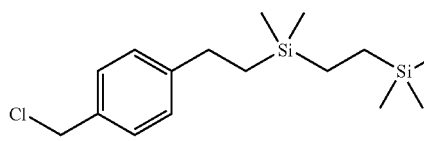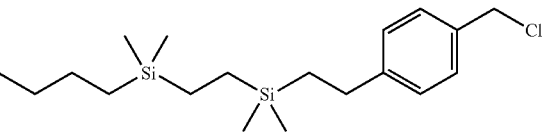

Platinum divinyltetramethyldisiloxane complex (1 drop, 2.1-2.4 wt. % Pt in xylene) was added to a solution of 1,1,4,4-tetramethyl-1,4-disilabutane (8.80 g, 0.060 mol), 1,7-octadiene (3.30 g, 0.0.03 mol) and vinylbenzyl chloride (9.17 g, 0.060 mol) in toluene (40 mL). After an initial exotherm, the reaction mixture was stirred at room temperature for 3 days, and toluene was removed in vacuo to give the unpurified product as a viscous liquid.

Synthesis of Membrane Composition E1:

A 250-mL 3-necked round bottom flask equipped with magnetic stirring, heating mantle, thermocouple, and inlet for nitrogen blanketing was charged with 10 g styrene/vinylbenzyl chloride copolymer (S/VBC, composition 63.1 mol % styrene, 36.9 mol % VBC, $M_n$=55-60 kg/mole, polydispersity 1.3), a mixture of tetramethylimidazole (3.27 g, 26.3 mmol), organosilane OS1 (0.15 g, 0.664 mmol benzyl chloride, 1.1 wt. % of total solids) to a total of 0.85 equiv. base to 1 equiv. benzyl chloride (contributed by copolymer and carbosilane), and 1-methoxy-2-propanol (26.8 g). The mixture was stirred at 70° C. for 48 hr, resulting in a pale yellow solution.

Synthesis of Membrane Composition E2:

A 250-mL 3-necked round bottom flask equipped with magnetic stirring, heating mantle, thermocouple, and inlet for nitrogen blanketing was charged with 10 g styrene/vinylbenzyl chloride copolymer (S/VBC, composition 63.1 mol % styrene, 36.9 mol % VBC, $M_n$=55-60 kg/mole, polydispersity 1.3), a mixture of tetramethylimidazole (3.33 g, 26.8 mmol), organosilane OS1 (0.29 g, 1.288 mmol benzyl chloride, 2.1 wt. % of total solids) to a total of 0.85 equiv. base to 1 equiv. benzyl chloride (contributed by copolymer and carbosilane), and 1-methoxy-2-propanol (26.8 g). The mixture was stirred at 70° C. for 48 hr, resulting in a pale yellow solution.

Synthesis of Membrane Composition E3:

A 250-mL 3-necked round bottom flask equipped with magnetic stirring, heating mantle, thermocouple, and inlet for nitrogen blanketing was charged with 10 g styrene/vinylbenzyl chloride copolymer (S/VBC, composition 63.1 mol % styrene, 36.9 mol % VBC, $M_n$=55-60 kg/mole, polydispersity 1.3), a mixture of tetramethylimidazole (3.24 g, 26.1 mmol), organosilane OS2 (0.15 g, 0.424 mmol benzyl chloride, 1.1 wt. % of total solids) to a total of 0.85 equiv. base to 1 equiv. benzyl chloride (contributed by copolymer and carbosilane), and 1-methoxy-2-propanol (26.8 g). The mixture was stirred at 70° C. for 48 hr, resulting in a pale yellow solution.

Synthesis of Membrane Composition CE1

A 250-mL 3-necked round bottom flask equipped with magnetic stirring, heating mantle, thermocouple, and inlet for nitrogen blanketing was charged with 10 g styrene/vinylbenzyl chloride copolymer (S/VBC, composition 63.1 mol % styrene, 36.9 mol % VBC, $M_n$=55-60 kg/mole, polydispersity 1.3), tetramethylimidazole (3.19 g, 25.7 mmol) to a total of 0.85 equiv. base to 1 equiv. benzyl chloride (contributed by copolymer only), and 1-methoxy-2-propanol (26.8 g). The mixture was stirred at 70° C. for 48 hr, resulting in a pale yellow solution.

Synthesis of Membrane Composition CE2

A 250-mL 3-necked round bottom flask equipped with magnetic stirring, heating mantle, thermocouple, and inlet for nitrogen blanketing was charged with 10 g styrene/vinylbenzyl chloride copolymer (S/VBC, composition 63.1 mol % styrene, 36.9 mol % VBC, $M_n$=55-60 kg/mole, polydispersity 1.3), a mixture of tetramethylimidazole (3.33 g, 26.8 mmol), control organosilane 1,1,4,4-tetramethyl-1,4-disilabutane (0.15 g, 1.1 wt. % of total solids, no benzyl chloride functionality) to a total of 0.88 equiv. base to 1 equiv. benzyl chloride (contributed by copolymer only), and 1-methoxy-2-propanol (26.8 g). The mixture was stirred at 70° C. for 48 hr, resulting in a pale yellow solution.

Synthesis of Membrane Composition CE3

A 250-mL 3-necked round bottom flask equipped with magnetic stirring, heating mantle, thermocouple, and inlet for nitrogen blanketing was charged with 10 g styrene/vinylbenzyl chloride copolymer (S/VBC, composition 63.1 mol % styrene, 36.9 mol % VBC, $M_n$=55-60 kg/mole, polydispersity 1.3), a mixture of tetramethylimidazole (3.33 g, 26.8 mmol), control organosilane, 1,4,4-tetramethyl-1,4-disilabutane (0.29 g, 2.1 wt. % of total solids, no benzyl chloride functionality) to a total of 0.88 equiv. base to 1 equiv. benzyl chloride (contributed by copolymer only), and 1-methoxy-2-propanol (26.8 g). The mixture was stirred at 70° C. for 48 hr, resulting in a pale yellow solution.

Examples E4-E5 and Comparative Examples CE4-CE5

Membrane polymers composed of dimethylimidazole (E4, CE4) and N-allylimidazole (E5, CE5) were synthesized in respective procedures analogous to those described for tetramethylimidazole (E1 and CE1).

Membrane Preparation and Characterization

Preparation of Membranes

Membranes (reported in Table 2) were prepared by coating 30-33 weight percent solids ionomer solutions on to a release liner with a polyethylene terephthalate backing coated with an acrylic-based release layer as described in U.S. Pat. No. 7,816,477 (Suwa et al.). Membranes were coated using a BYK BYKO-drive automatic applicator (Gardco) at a speed setting of 1 inch/sec (2.54 cm/sec) and with a notch bar applicator having a 10 mil (0.01 inch, 0.254 mm) gap, and then dried in a forced air oven at 80° C. for 30 minutes. Measured dry coating thicknesses were in the range of 45-52 microns.

show that a loading of 1 wt. % ionomeric organosilane OS2 increases elongation at break and toughness for a TMIM membrane polymer (E3) relative to a membrane polymer of comparable ION EXCHANGE CAPACITY (IEC) that does not carry carbosilane (CE1). A 2 wt. % loading of ionomeric organosilane OS1 does not confer the same benefit at comparable IEC (E2), nor does a non-ionomeric control carbosilane at comparable IEC and wt. % loading (CE2, CE3).

TABLE 2

| MEMBRANE/ MEMBRANE COMPOSITION | COMPOSITION | CONVERSION, % | ION EXCHANGE CAPACITY, mmol/g of quaternary ammonium groups |
|---|---|---|---|
| E1 | TMIM-derived ionic polymer; 1 wt. % Organosilane OS1 | 78 | 1.96 |
| E2 | TMIM Ionic polymer; 2 wt. % Organosilane OS1 | 77 | 1.97 |
| E3 | TMIM-derived ionic polymer; 1 wt. % Organosilane OS2 | 78 | 1.95 |
| CE1 | TMIM Ionic polymer control | 74 | 1.95 |
| CE2 | TMIM Ionic polymer; 1 wt. % Control carbosilane | 78 | 1.98 |
| CE3 | TMIM Ionic polymer; 2 wt. % Control carbosilane | 77 | 1.97 |
| E4 | DMIM Ionic polymer; 1 wt % Organosilane OS1 | 78 | 1.98 |
| CE4 | DMIM Ionic polymer control | 80 | 1.98 |
| E5 | N-Allyl IM Ionic polymer; 1 wt. % Organosilane OS1 | 78 | 2.03 |
| CE5 | N-Allyl IM Ionic polymer control | 73 | 2.03 |

Tensile Testing of Membranes

The tensile stress-strain behavior of wet membranes was examined at a constant strain rate of 2 mm/second. Samples were removed from the release liner and soaked in aqueous 1M KOH solution for 24 hours at room temperature, thoroughly washed with deionized water, cut into 1.00 cm×4.00 cm strips, and tested in a fully hydrated state using a TA XTPlus Texture Analyzer (Texture Technologies, Hamilton, Massachusetts). Four strips were cut and tensile tested for each membrane. The mean value from the four replicates is reported in Table 3. Dimensions of the membranes (x, y, z) were measured before and after the alkali soak in order to calculate swelling values.

The results show that loadings of 1 wt. % ionomeric organosilane OS1 are optimal to increase elongation at break and toughness for TMIM, DMIM and allyl IM membrane polymers (E1, E4, E5) relative to membrane polymers of comparable ION EXCHANGE CAPACITY (IEC) that do not carry carbosilane (CE1, CE4, CE5). The results also

TABLE 3

| MEMBRANE | ELONGATION AT BREAK, % | STRESS AT BREAK, MPa | MODULUS, MPa | DIMENSIONAL SWELL (x, y), | DIMENSIONAL SWELL (z), |
|---|---|---|---|---|---|
| E1 | 139 | 3.1 | 21 | 42 | 58 |
| E2 | 90 | 2.4 | 19 | 40 | 52 |
| E3 | 104 | 3.0 | 22 | 34 | 43 |
| CE1 | 96 | 3.0 | 21 | 40 | 49 |
| CE2 | 78 | 2.5 | 17 | 32 | 40 |
| CE3 | 14 | 1.6 | 21 | 30 | 21 |
| E4 | 72 | 3.5 | 19 | 30 | 37 |
| CE4 | 45 | 3.0 | 23 | 30 | 26 |
| E5 | 91 | 3.7 | 19 | 26 | 27 |
| CE5 | 57 | 6.9 | 64 | 20 | 22 |

Conductivity Testing of Membranes

Ionic conductivity was measured using a 4-probe Bekk-Tech BT-110 conductivity clamp (Scribner Associates, Inc., Southern Pines, NC) and a VMP3 Multi-channel potentiostat (Bio-Logic Science Instruments, Seyssinet-Pariset, France). A dry membrane sample in the chloride form (1.40 cm×4.00 cm) was assembled under two platinum wires, and the clamp was immersed into 18 megaohms deionized water for 2 hours before measurement to hydrate and swell the membrane. A current-voltage curve was recorded by applying a linear voltage sweep from an open circuit voltage (OCV) to 0.3 V first, then to −0.3 V, and finally back to OCV at 10 mV/second scan rate. Ionic conductivity was calculated from the slope of the resulting current-voltage curve using the measured dry membrane size and thickness, and an ionic conductivity clamp constant of 0.425 cm.

TABLE 4

| MEMBRANE | CONDUCTIVITY IN CL⁻ FORM, mS/cm |
|---|---|
| E1 | 20.6 |
| E2 | — |
| E3 | — |
| CE1 | 20.3 |
| CE2 | — |
| CE3 | — |
| E4 | 20.5 |
| CE4 | 18.5 |
| E5 | 19.0 |
| CE5 | 17.1 |

The preceding description, given in order to enable one of ordinary skill in the art to practice the claimed disclosure, is not to be construed as limiting the scope of the disclosure, which is defined by the claims and all equivalents thereto.

What is claimed is:

1. A dihaloorganosilane represented by the formula:

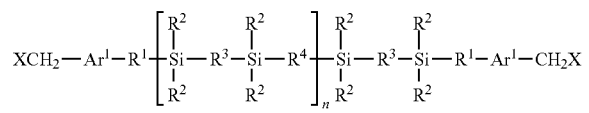

wherein:
each X independently represents Cl, Br, or I;
each Ar¹ independently represents a phenylene group optionally substituted by 1 to 4 alkyl groups selected from methyl or ethyl;
each R¹ independently represents an alkylene group having from 2 to 18 carbon atoms;
each R² independently represents methyl or ethyl;
each R³ independently represents an alkylene group having from 1 to 18 carbon atoms;
each R⁴ independently represents an alkylene group having from 2 to 18 carbon atoms; and
n is an integer in a range of 0 to 5, inclusive.

2. The dihaloorganosilane of claim 1, wherein each R¹ independently represents an alkylene group having 2 or 3 carbon atoms.

3. The dihaloorganosilane of claim 1, wherein each R³ independently represents an alkylene group having from 2 to 4 carbon atoms.

4. The dihaloorganosilane of claim 1, wherein each R⁴ independently represents an alkylene group having from 6 to 10 carbon atoms.

5. The dihaloorganosilane of claim 1, wherein n=0.
6. The dihaloorganosilane of claim 1, wherein n=1.
7. An ionic organosilane represented by the formula:

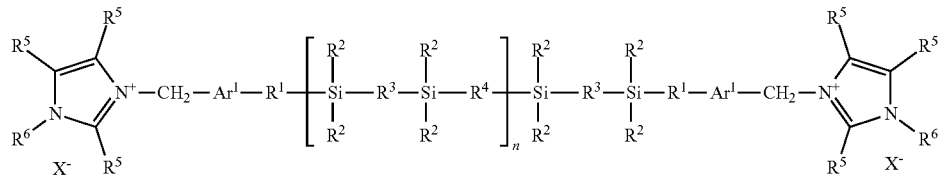

wherein:
each X independently represents Cl, Br, or I;
each Ar¹ independently represents a phenylene group optionally substituted by 1 to 4 alkyl groups selected from methyl or ethyl;
each R¹ independently represents an alkylene group having from 2 to 18 carbon atoms;
each R² independently represents methyl or ethyl;
each R³ independently represents an alkylene group having from 1 to 18 carbon atoms;
each R⁴ independently represents an alkylene group having from 2 to 18 carbon atoms;
each R⁵ independently represents H or methyl;
each R⁶ independently represents alkyl having from 1 to 4 carbon atoms, or allyl; and
n is an integer in a range of 0 to 5, inclusive.

8. The ionic organosilane of claim 7, wherein each R¹ independently represents an alkylene group having 2 or 3 carbon atoms.

9. The ionic organosilane of claim 7, wherein each R³ independently represents an alkylene group having from 2 to 4 carbon atoms.

10. The ionic organosilane of claim 7, wherein each R⁴ independently represents an alkylene group having from 6 to 10 carbon atoms.

11. The ionic organosilane of claim 7, wherein n=0.
12. The ionic organosilane of claim 7, wherein n=1.
13. A membrane composition comprising components:
(a) a copolymer comprising the divalent monomer units:

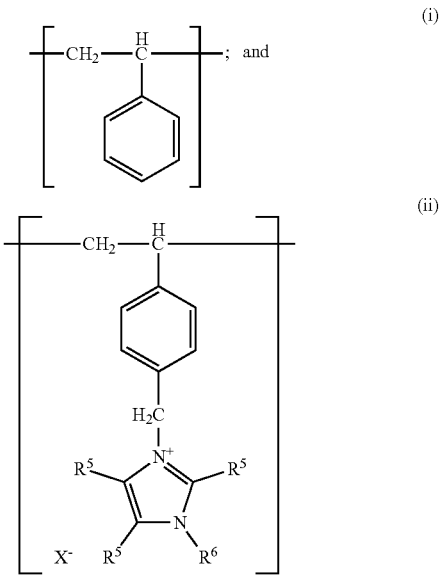

wherein:
- $R^5$ represents H or methyl;
- $R^6$ represents alkyl having from 1 to 4 carbon atoms, or allyl; and
- X represents Cl, Br, or I, and
- wherein monomer unit (i) and monomer unit (ii) are present in a respective mole ratio of 1.5:1 to 3:1; and (b) an ionic organosilane compound represented by the formula:

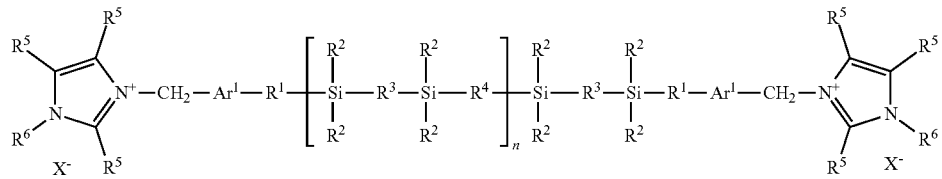

wherein:
- each $Ar^1$ independently represents a phenylene group optionally substituted by 1 to 4 alkyl groups selected from methyl or ethyl;
- each $R^1$ independently represents an alkylene group having from 2 to 18 carbon atoms;
- each $R^2$ independently represents methyl or ethyl;
- each $R^3$ independently represents an alkylene group having from 1 to 18 carbon atoms;
- each $R^4$ independently represents an alkylene group having from 2 to 18 carbon atoms; and
- n is an integer in a range of 0 to 5, inclusive; and
wherein component (a) and component (b) are present in a respective weight ratio in a range of 99.5:0.5 to 98:2.

14. The membrane composition of claim 13, wherein each $R^1$ independently represents an alkylene group having 2 or 3 carbon atoms.

15. The membrane composition of claim 13, wherein each $R^3$ independently represents an alkylene group having from 2 to 4 carbon atoms.

16. The membrane composition of claim 13, wherein each $R^4$ independently represents an alkylene group having from 6 to 10 carbon atoms.

17. The membrane composition of claim 13, wherein n=0.

18. The membrane composition of claim 13, wherein n=1.

19. The membrane composition of claim 13, wherein $R^6$ represents alkyl having from 1 to 4 carbon atoms.

20. The membrane composition of claim 13, wherein $R^6$ represents allyl.

21. A membrane comprising the membrane composition of claim 13.

* * * * *